United States Patent
Bang et al.

(10) Patent No.: US 7,152,014 B2
(45) Date of Patent: Dec. 19, 2006

(54) METHOD AND APPARATUS FOR ENTERING INFORMATION INTO A PORTABLE ELECTRONIC DEVICE

(75) Inventors: Won-chul Bang, Gyeonggi-do (KR);
Dong-yoon Kim, Seoul (KR);
Jong-koo Oh, Gyeonggi-do (KR);
Joon-kee Cho, Gyeonggi-do (KR);
Kyoung-ho Kang, Gyeonggi-do (KR);
Sung-jung Cho, Gyeonggi-do (KR);
Eun-seok Choi, Gyeonggi-do (KR);
Wook Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/002,796

(22) Filed: Dec. 3, 2004

(65) Prior Publication Data
US 2005/0246109 A1    Nov. 3, 2005

(30) Foreign Application Priority Data
Apr. 29, 2004    (KR) .................... 10-2004-0029852

(51) Int. Cl.
*G01P 15/00*    (2006.01)
(52) U.S. Cl. ..................................... 702/141
(58) Field of Classification Search ................. 702/141
See application file for complete search history.

(56) References Cited

U.S. PATENT DOCUMENTS 6,369,794 B1 *  4/2002   Sakurai et al. ............... 345/156
2002/0167699 A1 * 11/2002 Verplaetse et al. .......... 359/158

FOREIGN PATENT DOCUMENTS

JP    2002-133369    5/2002

\* cited by examiner

*Primary Examiner*—John Barlow
*Assistant Examiner*—Cindy D. Khuu
(74) *Attorney, Agent, or Firm*—Buchanan Ingersoll & Rooney PC

(57) ABSTRACT

An input device includes a sensor configured to generate a signal related to a change in inertia around at least one axis of the input device in response to a contacting of the input device. A processor is configured to receive the signal from the sensor to determine whether the change in inertia around the at least one axis of the input device corresponds to a tapping of the input device. The processor is further configured to identify a contacted region of the input device based on a direction of the change in inertia around the at least one axis of the input device when the change in inertia corresponds to a tapping of the input device

45 Claims, 9 Drawing Sheets

METHOD AND APPARATUS FOR ENTERING INFORMATION INTO A PORTABLE ELECTRONIC DEVICE

BACKGROUND

The proliferation in the use of portable electronic devices has led to the development of a number of different types of input devices for entering information into the portable devices. These input devices can include keypads, touchpads, touchscreens, displays, joy-sticks, pointing devices such as a mouse or a stylus, and audio response units. The designs of some of these input devices can be complex, as can the underlying electronics needed to process the entered information. Moreover, use of these input devices can require a level of dexterity that can be difficult for individuals having physical disabilities to achieve. Individuals with such disabilities can benefit from having a simplified interface for entering user information.

For example, to activate a function of the electronic device, it can be necessary for a user to press certain keys of a keypad, or activate certain areas of a touchscreen or touchpad. Such actions can require an user to be sighted and to possess a certain amount of dexterity to activate the relatively small-sized keys or areas of the touchscreen or touchpad. It can be preferable to activate a function simply by contacting the electronic device using relatively larger regions. The contacting can be in the form of a tapping motion, similar to the motion performed using a stylus with a personal digital assistant (PDA). As used here, to tap or a tapping motion means to strike lightly or to give a light blow. Such motion can be limited in duration and can result in corresponding changes in inertia of limited duration.

Such a tapping motion can be detected using appropriate sensors or detectors, and a function performed in response to the detected tapping. For example, U.S. Pat. No. 6,369,794 describes an arrangement having a motion detecting unit and a motion analyzing unit that analyzes a direction, strength, and number of occurrence of the detected motion. The detected motion is used as a simple switch (on or off) to activate a function. While this arrangement can determine that a motion has occurred, it cannot identify an area in which a contact may have occurred to cause the detected motion information identifying the areas in which an electronic device is contacted or tapped can be used to invoke or control more complex functions of the device without requiring that a user utilize the other more complex input devices of the unit, such as keypads or touchscreens, to access these features.

SUMMARY

Accordingly, a method and system are disclosed for entering information into an portable electronic device. According to an exemplary embodiment, an input device includes a sensor configured to generate a signal related to a change in inertia around at least one axis of the input device in response to a contacting of the input device. A processor is configured to receive the signal from the sensor to determine whether the change in inertia around the at least one axis of the input device corresponds to a tapping of the input device. The processor is further configured to identify a contacted region of the input device based on a direction of the change in inertia around the at least one axis of the input device when the change in inertia corresponds to a tapping of the input device.

According to another exemplary embodiment, a system is described for entering information into a portable electronic device. The system includes a housing and an input device having a sensor configured to generate a signal related to a change in inertia around at least one axis of the input device in response to a contacting of the input device. The input device further includes a processor that is configured to receive the signal from the sensor to determine whether the change in inertia around the at least one axis of the input device corresponds to a tapping of the input device. The processor is further configured to identify a contacted region of the input device based on a direction of the change in inertia around the at least one axis of the input device when the change in inertia corresponds to a tapping of the input device. The system includes circuitry coupled to the input device that is configured to perform at least one function based on the identity of the contacted region of the input device.

According to an exemplary embodiment, a method of entering information into an electronic device includes measuring a change in inertia around at least one axis of an input device in response to a contacting of the input device. A determination is made whether the change in inertia around the at least one axis of the input device corresponds to a tapping of the input device. A contacted region of the input device is identified based on a direction of the change in inertia around the at least one axis of the input device when the change in inertia corresponds to a tapping of the input device.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computer system. For example, it will be recognized that in each of the embodiments, the various actions can be performed by specialized circuits or circuitry (e.g., discrete and/or integrated logic gates interconnected to perform a specialized function), by program instructions being executed by one or more processors, or by a combination of both.

Figure 1A:
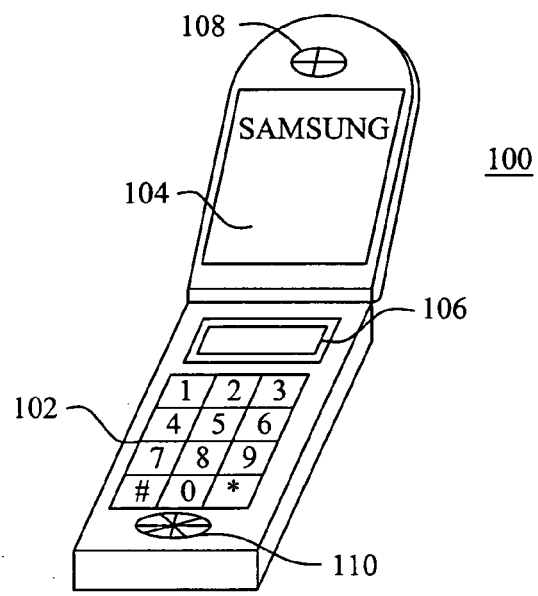
FIGS. 1A–1D illustrate a portable electronic device and exemplary input devices for entering information into the electronic device.
Figures 1B, 1C:
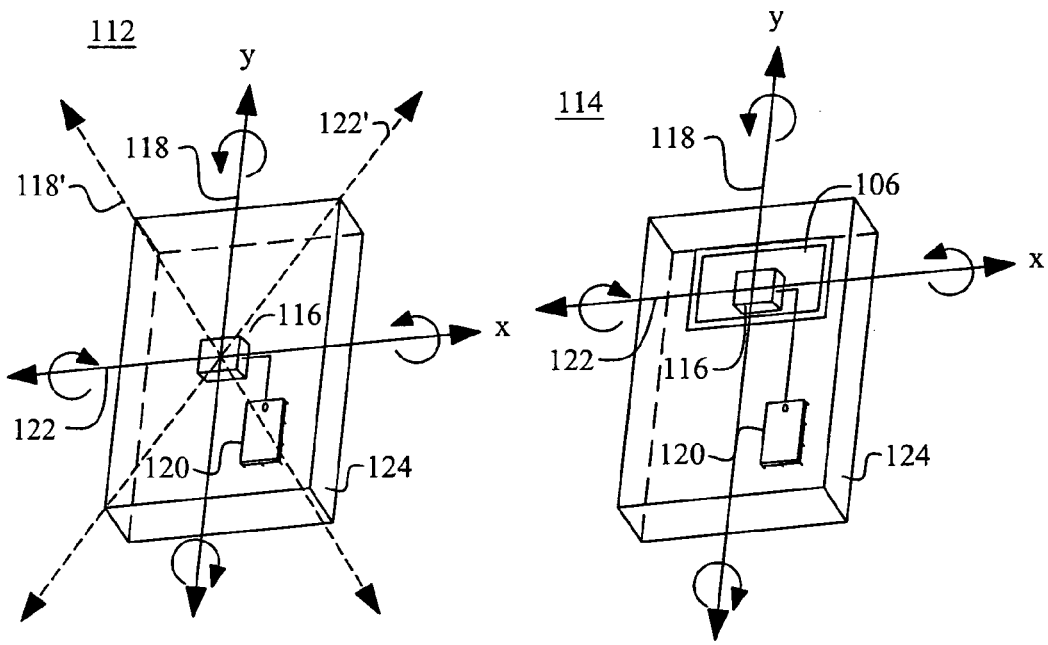

FIGS. 1A–1D illustrate a portable electronic device 100 and exemplary input devices 112, 114 for entering information into the electronic device 100. FIG. 1A depicts a portable telephone (or flip-phone) 100 having a numeric keypad 102 and a display 104. The telephone 100 can include an input region 106, such as a touchpad, a touchscreen, or other similar type device. The input region can be configured to rotate about at least one axis, such as the axes 118, 122 shown. The portable telephone 100 can also include a speaker 108 and a microphone 110 as part of an audio response unit of the telephone 100. FIGS. 1B and 1C depict section views of a housing portion 124 of the flip-phone 100, and illustrate input devices 112, 114 according to two exemplary embodiments.

Each input device 112, 114 includes a sensor 116 configured to generate a signal related to a change in inertia around at least one axis 118 of the input device 112, 114 in response to a contacting of the device 100. The sensor 116 can include at least one of a gyroscope, an accelerometer, a multi-axis gyroscope, and a multi-axis accelerometer, as examples. Any device capable of producing signals indicative of the location of a tap or tapping on the device 100 could be potentially used. As discussed above, a tap or a tapping motion can include striking an object lightly or giving the object a light blow. Such motion can be limited in duration and can result in corresponding changes in inertia of limited duration that can be detected by a suitable sensor 116. The terms "tap" or "tapping" are merely illustrative, and are intended to include any striking of an object that can be detected by the sensor 116.

When, for example, in FIG. 1B a user contacts a region of the housing 124 of a stationary telephone 100 to the right of the at least one axis 118, for example, by tapping to the right of the axis 118, the telephone 100 will rotate clockwise around the axis 118. This change in inertia of the telephone 100 can be measured, for example as a change in angular velocity or angular acceleration, by the sensor 116, and a signal can be generated by the sensor 116 that is related to the change in inertia. Similarly, in the arrangement shown in FIG. 1C, a user can contact a portion of the rotatable input region 106 to the right of the at least one axis 118, for example, by tapping to the right of the axis 118, the input region 106 will rotate clockwise around the axis 118. This change in inertia of the input region 106 can be measured, for example as a change in angular velocity or angular acceleration, by the sensor 116, and a signal can be generated by the sensor 116 that is related to the change in inertia.

Figure 2:
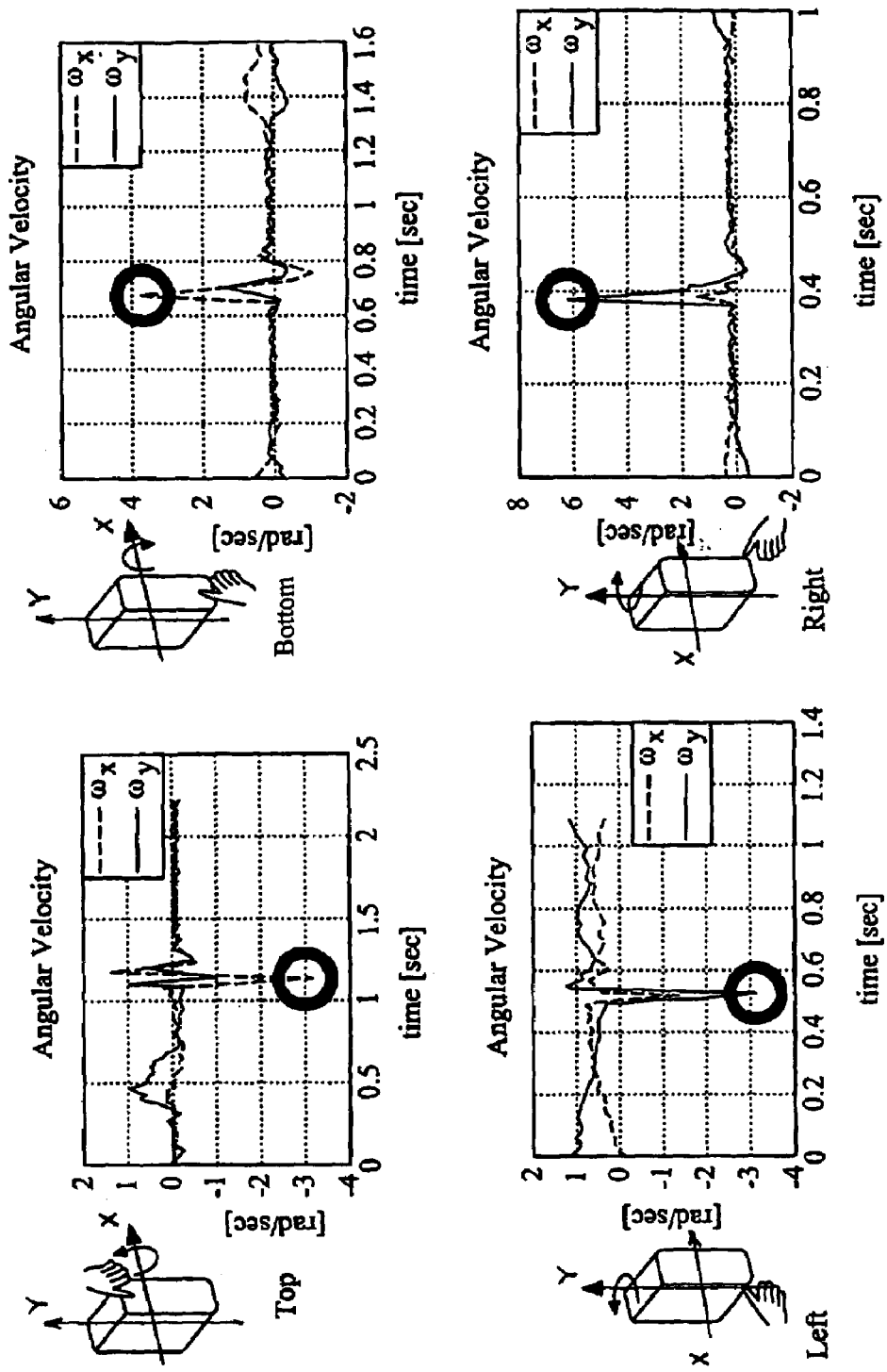
FIG. 2 illustrates graphs of the angular velocity of a stationary portable electronic device as the device is contacted, or tapped, at the top, bottom, left, and right portions of its face.

FIG. 2 illustrates graphs of the angular velocity of a stationary telephone 100 as the housing 124 of the telephone is contacted, or tapped, at the top, bottom, left, and right portions of the face of telephone 100. The solid lines in the graphs illustrate the angular velocity $\omega_y$ when the face of telephone 100 is pivoting left or right, that is, when the telephone is rotating around the axis 118 as a result of the tapping. The dashed lines illustrate the angular velocity $\omega_x$ when the face of telephone 100 is pivoting up and down, that is, when the telephone is rotating around the axis 122 as a result of the tapping. The circled "peaks" shown in the figure represent the angular velocity at the times the telephone is "tapped". The tapping action can generate sharp changes in the angular velocities measured by the sensor 116 of the telephone 100 that can last for only limited durations. The angular velocity can be measured, for example, using a multi-axis gyroscope 116 attached to the housing 124 of the telephone near the intersection of the axes 118, 122. Such a multi-axis gyroscope 116 can generate signals corresponding to the measured angular velocity.

Figure 3:
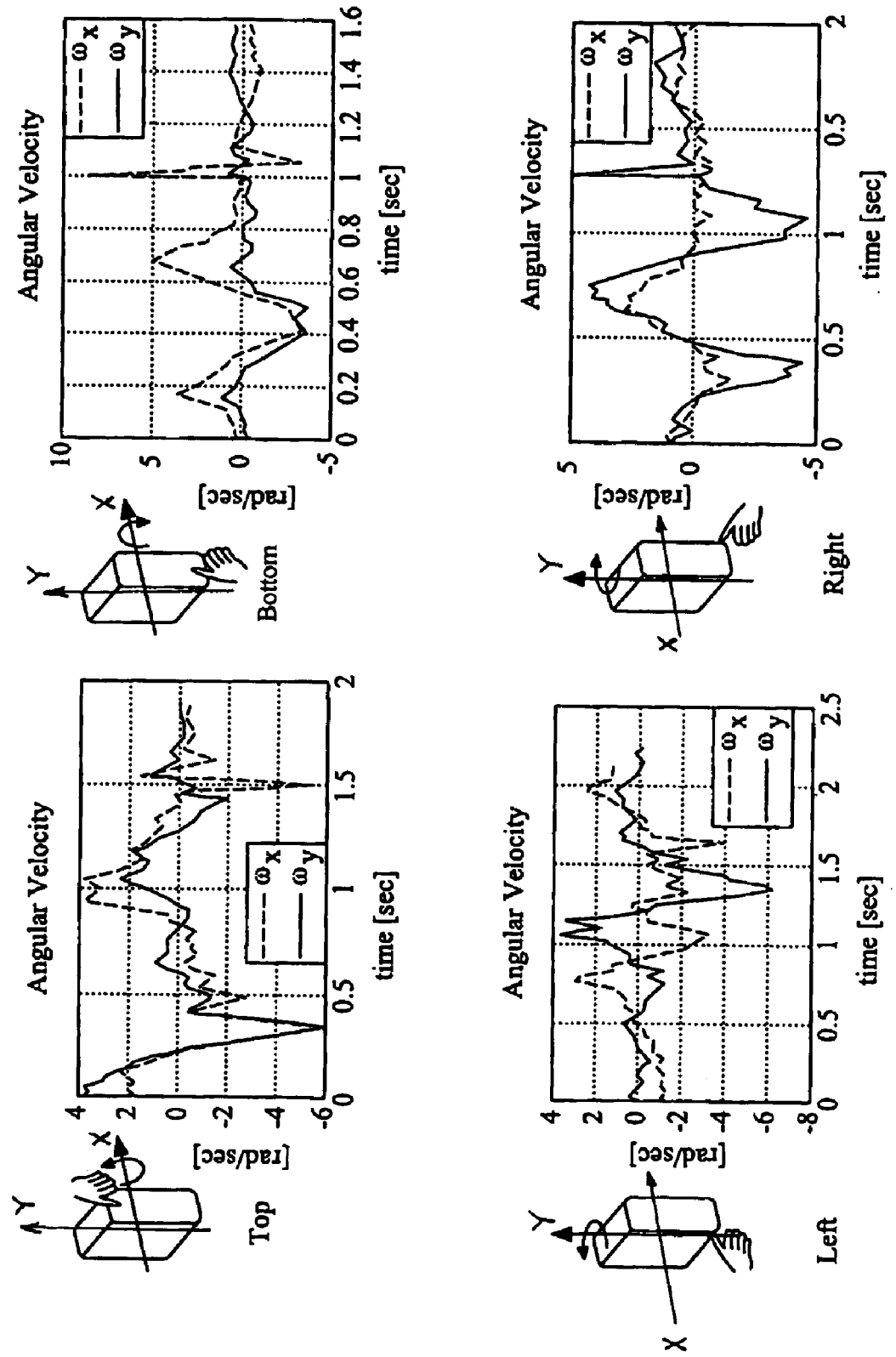
FIG. 3 illustrates graphs of the angular velocity of a moving portable electronic device as the device is contacted, or tapped, at the top, bottom, left, and right portions of its face.

If the telephone 100 is moved while being tapped, for example, as a result of a user walking or driving a vehicle while the tapping is occurring, these unintentional movements can corrupt or mask the sharp changes in angular velocity that can be used to identify the times when the telephone 100 is being tapped. FIG. 3 illustrates graphs of the angular velocity of a moving telephone 100 as the housing 124 of the telephone is contacted, or tapped, at the top, bottom, left, and right portions of the face of telephone 100. As can be seen from the figure, the sharp peaks indicative of the times the telephone 100 is being tapped are corrupted or masked by the "background noise" caused by the movement of the telephone.

Figure 4:
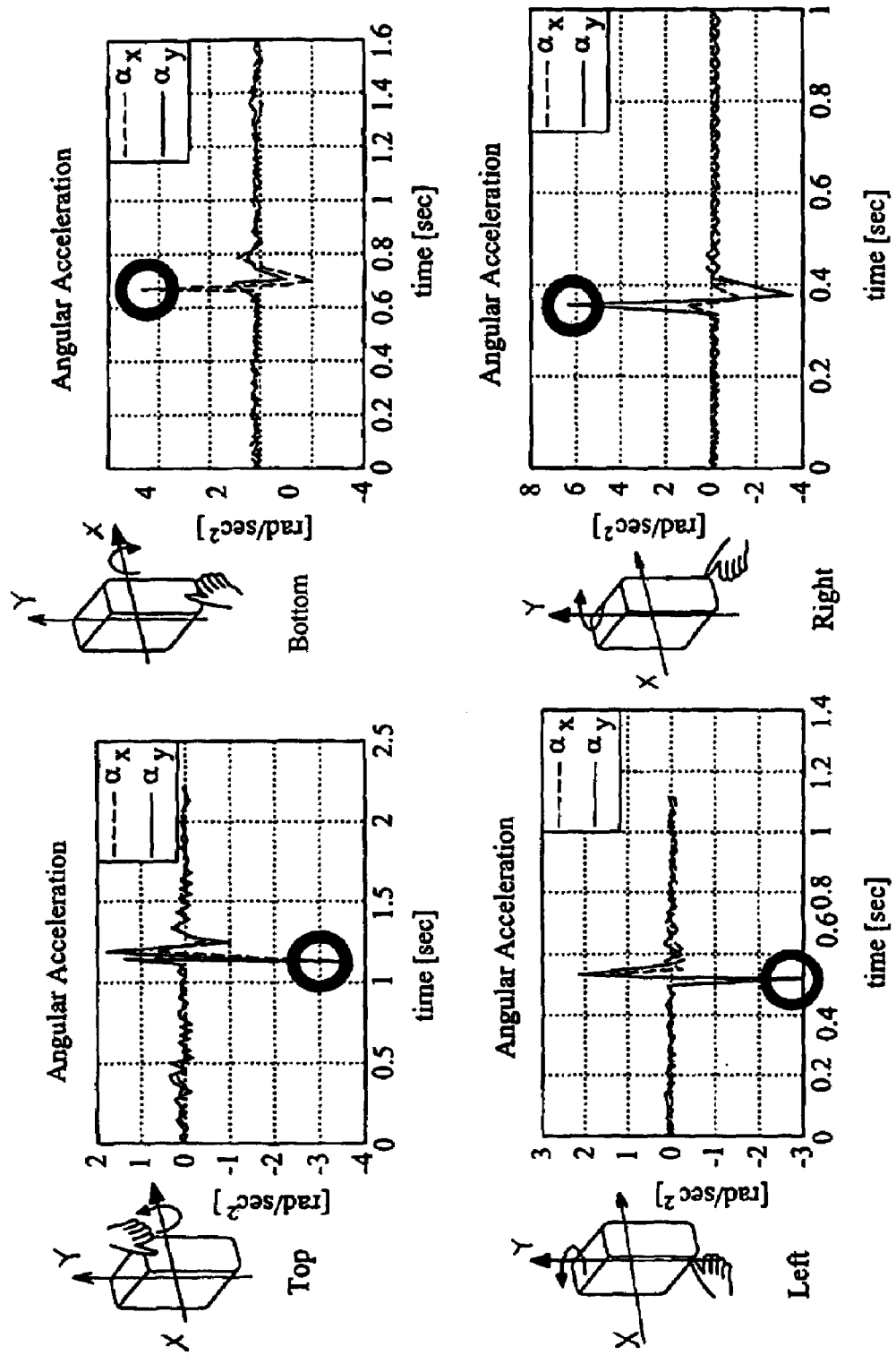
FIG. 4 illustrates graphs of the angular acceleration of a moving portable electronic device as the device is contacted, or tapped, at the top, bottom, left, and right portions of its face.

As long as the movement of the telephone 100 remains relatively constant, as can be the case when a user is walking or driving with the telephone 100, the angular acceleration of the telephone 100 can be determined to more easily identify the times when the telephone is tapped. FIG. 4 illustrates graphs of the angular acceleration of a moving portable telephone 100 as the telephone 100 is being contacted, or tapped, at the top, bottom, left, and right portions of its face. The solid lines in the graphs illustrate the angular acceleration $\alpha_y$ when the face of telephone 100 is pivoting left or right, that is, when the telephone is rotating around the axis 118 as a result of the tapping. The dashed lines illustrate the angular acceleration $\alpha_x$ when the face of telephone 100 is pivoting up and down, that is, when the telephone is rotating around the axis 122 as a result of the tapping. The circled "peaks" shown in the figure represent the angular acceleration at the times the telephone is "tapped". As seen in the figure, the relatively high-frequency taps manifest themselves in the graphs as sharp peaks of changing angular acceleration of limited duration as compared to the near-zero angular acceleration of the nearly constant movements of the telephone 100.

The angular acceleration can be measured, for example, using a multi-axis accelerometer 116 attached to the housing 124 of the telephone near the intersection of the axes 118, 122. Such a multi-axis accelerometer 116 can generate signals corresponding to the measured angular acceleration. Alternatively, the angular velocity measured, for example, using a multi-axis gyroscope 116 can be differentiated to yield the angular acceleration of the telephone 100. Again, the multi-axis gyroscope 116 can be attached to the housing 124 of the telephone near the intersection of the axes 118, 122.

Figure 1D:
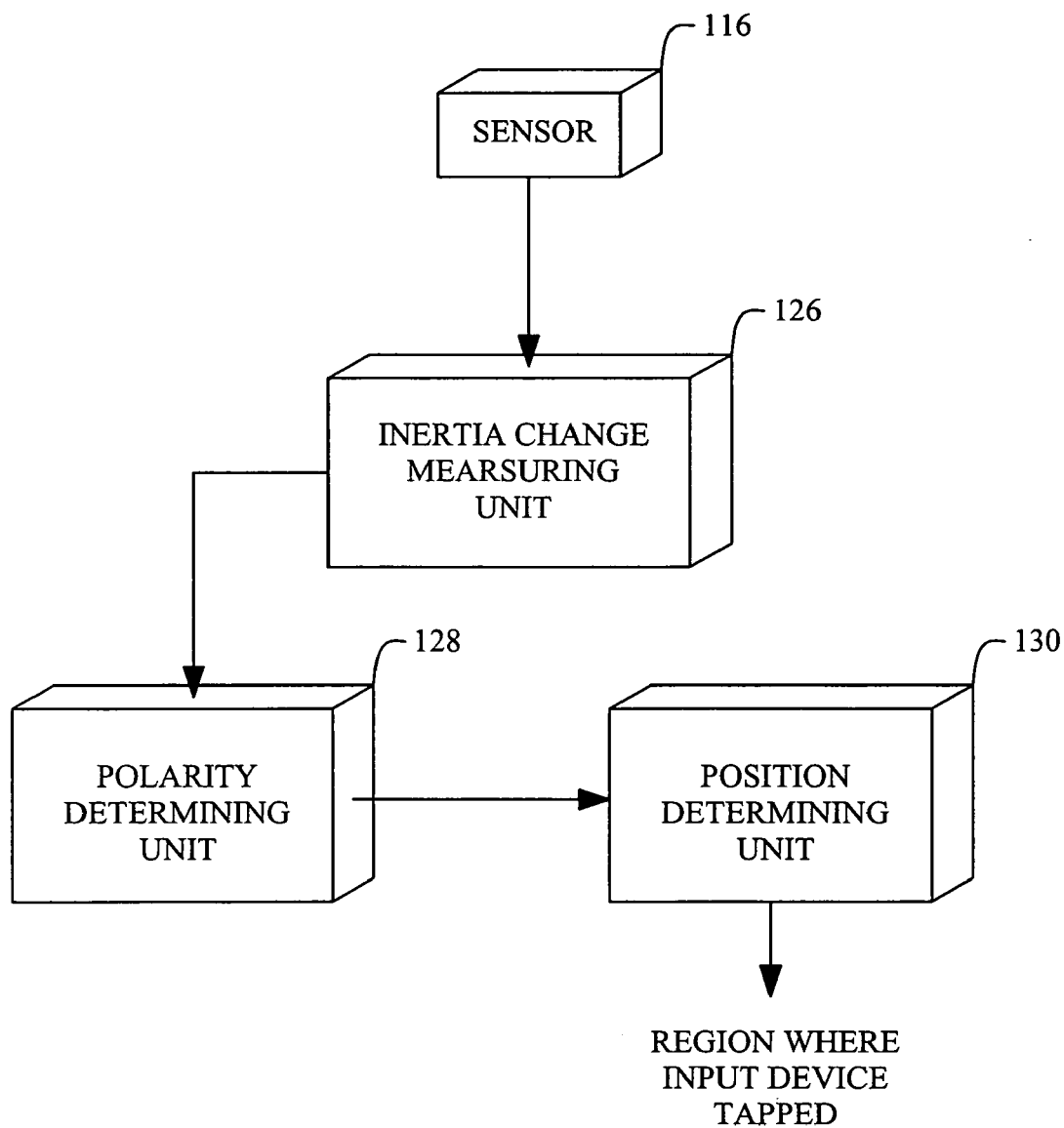

Returning to FIG. 1, the input devices 112, 114 further include a processor 120, such as a signal processor, a multi-purpose processor, or a central processing unit (or CPU), configured to receive the signal from the sensor 116. The processor 120 is configured to receive the signal from the sensor to determine whether the change in inertia around the at least one axis 118 of the input device corresponds to a tapping of the input device 112, 114. As shown in FIG. 1D, the processor 120 can include an inertia change measuring unit 126 coupled to the sensor 116. The inertia change measuring unit 126 can be configured to determine whether a magnitude of an angular acceleration of the input device 112, 114 around the at least one axis 118 exceeds a threshold acceleration value over a limited duration. In one embodiment, for example, were the threshold value to be set to about 3 rad/s² for about 0.1 seconds, the magnitudes of the angular accelerations shown in FIG. 4 would be determined to exceed the threshold value over the limited duration, indicating that the telephone 100 had been tapped.

The processor 120 is also configured to identify a contacted region of the input device 112, 114 based on a direction of the change in inertia around the at least one axis 118 of the input device 112, 114 when the change in inertia corresponds to a tapping of the input device 112, 114. For example, the processor 120 can include a polarity determining unit 128, coupled to the inertia change measuring unit 126, configured to determine a polarity of the angular acceleration that exceeds the threshold acceleration value for the limited duration. The processor 120 can also include a position determining unit 130, coupled to the polarity determining unit 128, configured to identify a first region of the input device 112, 114 as the contacted region when the polarity of the angular acceleration is positive and a second region of the input device 112, 114 as the contacted region when the angular acceleration is negative.

For example, the angular acceleration curves shown in FIG. 4 resulting from tapping the bottom or right portions of the telephone 100 shown in FIG. 1B produce a positive angular acceleration. The polarity determining unit 128 can determine that the angular acceleration is positive, and then relay this information to the position determining unit 130, which can identify the bottom or right portions of the telephone 100 as the contacted first region. Likewise, the angular acceleration curves shown in FIG. 4 resulting from tapping the top or left portions of the telephone 100 shown in FIG. 1B produce a negative angular acceleration. The polarity determining unit 128 can determine that the angular acceleration is negative, and then relay this information to the position determining unit 130, which can identify the top or left portions of the telephone 100 as the contacted second region. The first and second regions of the input device 112 can be demarcated by the at least one axis 118. FIG. 1B shows the first or right and the second or left portions of the telephone being demarcated by the axis 118.

As briefly discussed above, the sensor 116 can be configured to generate a signal related to a change in inertia around two perpendicular axes 118, 122 of the input device 112 for example using either a multi-axis gyroscope or multi-axis accelerometer 116. With such an arrangement, the inertia change measuring unit 126 can be configured to determine whether at least one magnitude of an angular acceleration of the input device 112, 114 around each of the perpendicular axes 118, 122 exceeds a threshold acceleration value over a limited duration. The polarity determining unit 128 can be configured to determine a polarity of each of the angular accelerations that exceeds the threshold acceleration value for the limited duration.

The position determining unit 130 can be configured to identify contacted regions of the input device 112, 114 based on a direction of change in angular acceleration around each of the perpendicular axes 118, 122 as determined by the polarity determining unit 128. For example, tapping the bottom-right portion of the telephone 100 shown in FIG. 1B can result in the angular acceleration curves shown in FIG. 4, which indicate two positive changes in angular acceleration. The position determining unit 130 can be configured to identify the bottom-right portion of the input device 112 as a contacted first region when the polarities of both angular accelerations are positive. Likewise, tapping the top-left portion of the telephone 100 shown in FIG. 1B can result in the angular acceleration curves shown in FIG. 4, which indicate two negative changes in angular accelerations. The position determining unit 130 can be configured to identify the top-left portion of the input device 112 as a contacted second region when the polarities of both angular accelerations are positive.

The position determining unit 130 can be configured to identify a third region of the device as the contacted region when the polarity of the angular acceleration around a first of the perpendicular axes is positive and the angular acceleration around a second of the perpendicular axes is negative. As an example, consider the angular acceleration curves shown in FIG. 4 resulting from tapping the top-right portion of the telephone 100. The angular acceleration around the first of the perpendicular axes 118 is positive and the angular acceleration around the second of the perpendicular axes 122 is negative.

The position determining unit 130 can also be configured to identify a fourth region of the device as the contacted region when the polarity of the angular acceleration around the first perpendicular axis is negative and the angular acceleration around the second perpendicular axis is positive. For example, consider the angular acceleration curves shown in FIG. 4 resulting from tapping the bottom-left portion of the telephone 100. The angular acceleration around the first of the perpendicular axes 118 is negative and the angular acceleration around the second of the perpendicular axes 122 is positive.

Each region (bottom-right, top-left, top-right, and bottom-left) of the input device 112 can be demarcated by a portion of each of the perpendicular axes 118, 122. It will be understood that the orientation of the sensor 116, for example, the multi-axis accelerometer 116 can be offset from the face of the telephone so as to result in the offset perpendicular axes 118', 122'. These offset perpendicular axes 118', 122', in turn, can demarcate new contact regions of the input device 112, 114 corresponding to the right, left, top, and bottom of the input device 112, 114, respectively.

According to an exemplary embodiment, the position determining unit 130 can also be configured to identify a boundary area of one of the regions of the device as the contacted region when only one of the angular accelerations exceeds the threshold acceleration value for the limited duration. For example, consider once again the arrangement shown in FIG. 1B, where the sensor 116 can be configured to generate a signal related to a change in inertia around two perpendicular axes 118, 122 of the input device 112. If a user taps substantially near the right edge and near the center of the input device 112, only the angular acceleration around the axis 118 will exceed the threshold acceleration value for the limited duration. There will little or no angular acceleration around the axis 122, because in the example, the user has tapped the input device 112 substantially on the axis 122. The extent of the boundary areas can be determined by moments of inertia around each of the perpendicular axes 118, 122. Preferably, the sensor is arranged near the center of the housing 124 or the input region 106 of the telephone 100.

As described above, the sensor 116 can be configured to generate a signal related to an angular velocity of the input device 112, 114 around the at least one axis 118. If the background noise resulting from the movement of the telephone 100 is problematic, the processor 120 can be configured to differentiate the angular velocity to determine an angular acceleration of the device 112 around the at least one axis 118. The sensor can also be configured to generate a signal related to the angular acceleration of the input device 112, 114 around the at least one axis 118. In addition, a filter (not shown) can be coupled between the sensor 116 and the processor 120 to filter the signal received by the processor 120 prior to the processor determining whether the change in inertia around the at least one axis of the input device corresponds to a tapping of the input device. For example, the filter can be a dampening circuit configured to dampen out vibrations that can corrupt the angular velocity or angular acceleration measurement.

In another exemplary embodiment, the electronic device 100 includes circuitry coupled to the input device 112, 114 that can perform at least one function based on the identity of the contacted region of the input device 112, 114. The circuitry can include memory (not shown) for storing program instructions that can be executed by the processor 120 for performing the function.

The function can include controlling a volume of the audio played through the speaker 108. The function can also include scrolling through a menu presented on the display 104. The function can also include scrolling through a list of items presented either on the display 104 or the input region 106 of the telephone 100. In addition, the function can include selecting an item of a menu or an item included in a list displayable on the display 104 or input region 106. Also, the function can include displaying characters or symbols on the display 104. The electronic device 100 can also include an input feedback unit (not shown) configured to provide an auditory response identifying the at least one function performed based on the identity of the contacted region of the input device. The auditory response can be provided via the speaker 108. This can be a useful feature, as the context-based function performed following a tap can be unknown to a user at the time of invocation.

According to another exemplary embodiment, the processor 120 can be configured to detect within a time frame a plurality of changes in inertia around the at least one axis 118 of the input device 112, 114 corresponding to a plurality of taps of the input device 112, 114. The circuitry included in the electronic device 100 can be configured to perform the at least one function based on an order of the identified contacted regions corresponding to the plurality of taps detected within the time frame. For example, the at least one function can include activating a "hot key" to navigate directly to and perform a function included at a lower menu level in a multi-level, menu-driven user interface.

Figure 5:
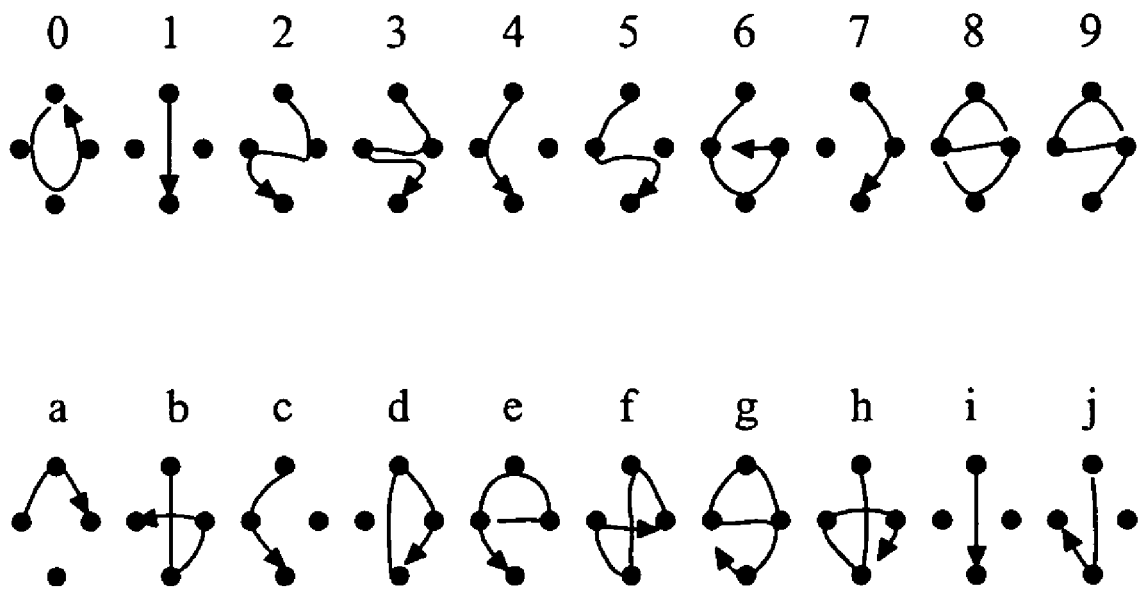
FIG. 5 illustrates exemplary sequences of taps that can be entered using the input devices shown in FIGS. 1A–1D to form the characters shown.

According to another exemplary embodiment, the at least one function can include recognizing a character associated with the order of the identified contacted regions corresponding to a plurality of taps detected within a time frame. FIG. 5 illustrates exemplary sequences of taps that can be entered using the input device 112, 114 to form the characters shown. A user can tap the input device 112, 114 consecutively in the approximate regions shown with any given time frame, for example three seconds. The processor 120, including the inertial change measuring unit 126, the polarity determining unit 128, and position determining unit 130, can determine the identities of the regions tapped using the techniques described above. An appropriate character associated with the order of the identified contacted regions can then be presented on the display 104 or in the input region 106.

As described above in conjunction with the exemplary embodiment shown in FIG. 1B, the sensor 116 can be attached to the housing 124 of the electronic device 100. The sensor 116 is preferable attached near the center of the housing 124 as shown in the figure. With such an arrangement, any portion of the electronic device can serve as the contacted region of the input device. According to an exemplary embodiment, the contacted region includes at least one surface of the housing, preferable the surface corresponding to the front face of the electronic device 100.

Figure 6A:
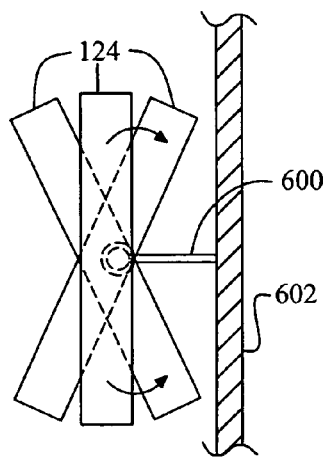
FIGS. 6A–6C illustrate means for removably securing the electronic device and means for facilitating a rotating of the electronic device according to exemplary embodiments.
Figure 6B:
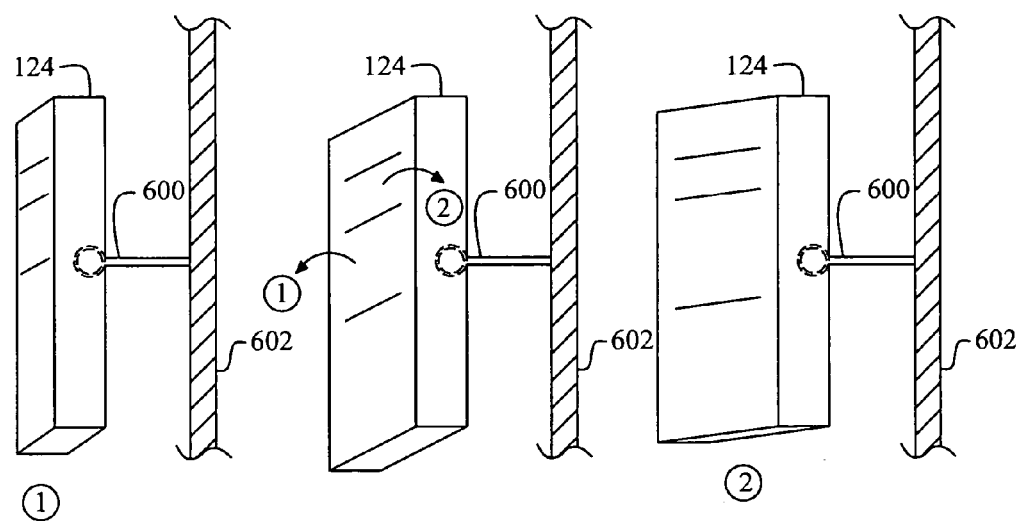

When the entire electronic device can serve as the contacted region of the input device, it can be useful to include means for removably securing the housing to a rigid surface and means for facilitating a rotating of the electronic device around the at least one axis. For example, in FIGS. 6A and 6B, an arrangement is shown in which a gimbal 600 is removably attached to the housing 124 of the electronic device 100 and a rigid surface 602. The rigid surface 600 can be a surface of an automobile interior, such as a dashboard or instrument cluster. The gimbal 600 allows the device to rotate substantially in any direction around the perpendicular axes 118, 112. A simple detachable "ball-joint" arrangement is shown in the figures, but the skilled artisan will understand that other designs can be employed. FIG. 6A illustrates movement of the device around the axis 122, while FIG. 6B illustrates movement around the axis 118. The arrangement also facilitates compound movements around both perpendicular axes 118, 122.

Figure 6C:
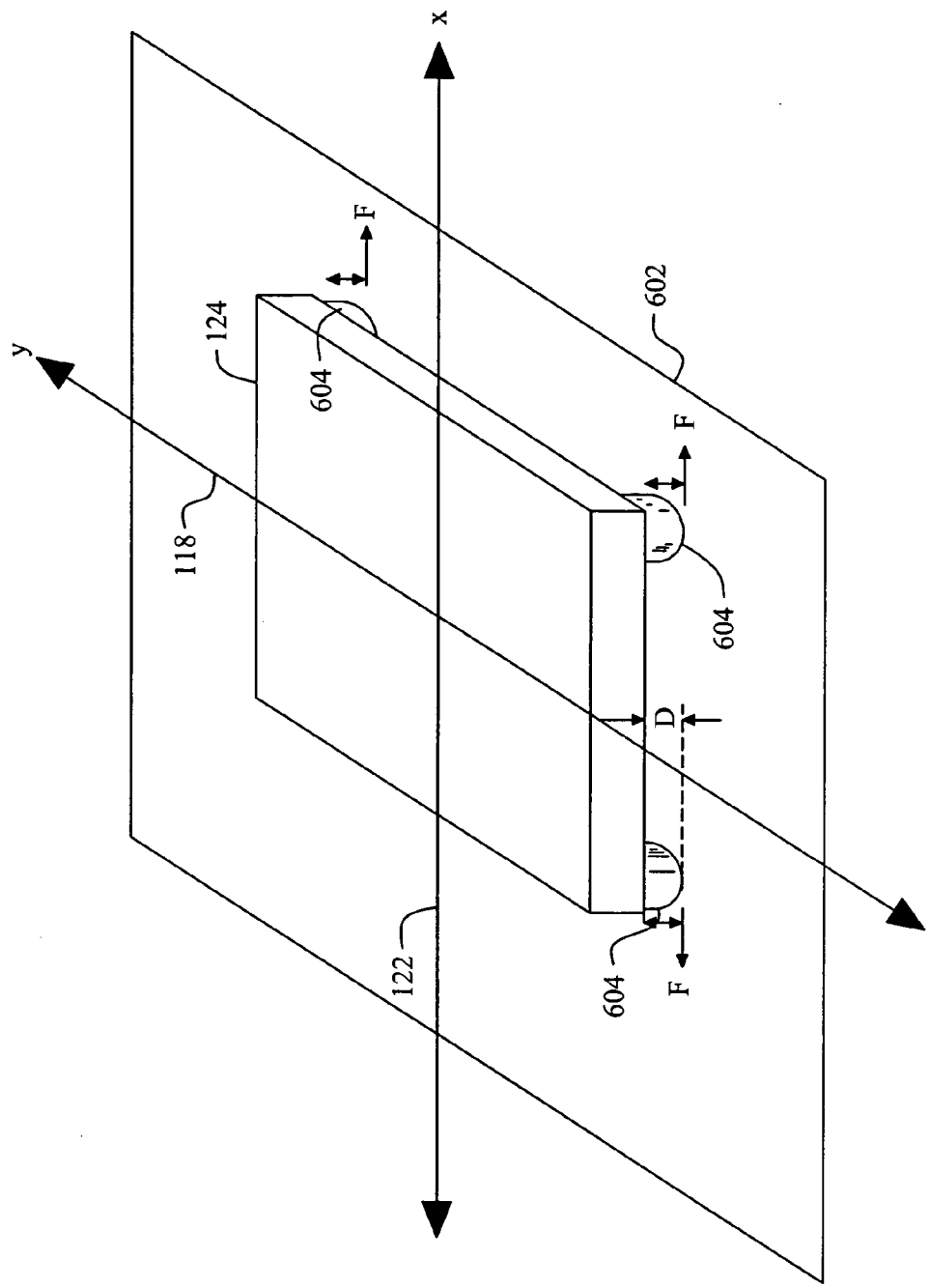

FIG. 6C illustrates means for removably securing the housing and means for facilitating a rotating of the electronic device can also include a plurality of deformable spacers 604 arranged on the housing 124 to provide friction F for removably securing the housing 124 to the rigid surface 602. The spacers can provide for a separation D between the housing 124 and the rigid surface 602 to facilitate a rotating of the electronic device around the at least one axis 118.

According to another exemplary embodiment, the sensor can be attached to a separately rotatable portion of the housing configured to rotate around the at least one axis 118. For example, FIG. 1B shows an arrangement in which the sensor 116 is attached to a separately rotatable portion 106 of the housing 124 The portion 106 is attached so as to be rotatable around the at least one axis 118. The contacted region of the input device 114 includes the separately rotatable portion 106, such that a user can tap in the rotatable portion 106 to activate functions of the electronic device 100. The rotatable portion 106 can correspond to an input region, such as a touchpad or touchscreen.

Although the electronic device has been described here only as a portable telephone, persons skilled in the art will understand that the device 100 can also be a PDA or an electronic game. Moreover, the contacted region of the input device 112, 114 can be included in at least one other portion of the electronic device, such as a keypad, a touchpad, a touchscreen, and a display of the device. In addition to the input device 112, 114, the electronic device can include other input devices, such as a keypad, a touchpad, a touchscreen, a display, a joy-stick, a mouse, and an audio response unit. The processor 120 can be configured to disable the input device 112, 114 based on at least one of an oral command, tapping the input device a plurality of times within a time frame, a manual switch, and a proximity switch.

Figure 7:
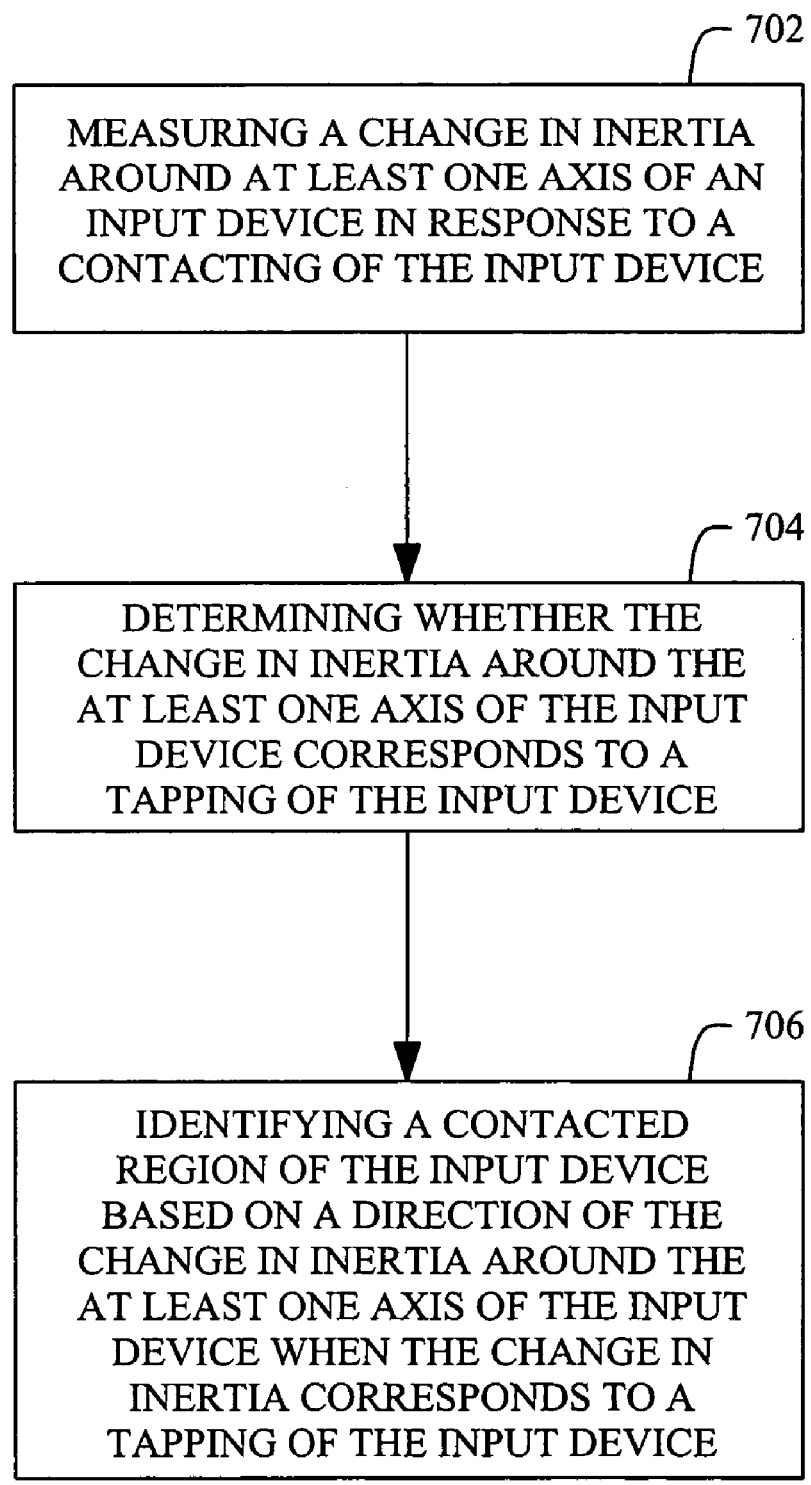
FIG. 7 is a flowchart illustrating a method for entering information into an portable electronic device, according to an exemplary embodiment.

FIG. 7 depicts a flowchart illustrating an exemplary method for entering information into an portable electronic device. The method can be carried out using the exemplary arrangements described above, so the reader is referred to those sections for illustrative examples. The method starts in block 702, with measuring a change in inertia around at least one axis of an input device in response to a contacting of the input device. In block 704, a determination is made whether the change in inertia around the at least one axis of the input device corresponds to a tapping of the input device. In block 706, a contacted region of the input device is identified based on a direction of the change in inertia around the at least one axis of the input device when the change in inertia corresponds to a tapping of the input device.

According to an exemplary embodiment, determining whether the change in inertia around the at least one axis of the input device corresponds to a tapping of the input device can include determining whether a magnitude of an angular acceleration of the input device around the at least one axis exceeds a threshold acceleration value over a limited duration. For example, FIG. 4 illustrates graphs of the angular acceleration of a moving portable telephone 100 as the telephone 100 is being contacted, or tapped, at the top, bottom, left, and right portions of its face. As seen in the figure, the relatively high-frequency taps manifest themselves in the graphs as sharp peaks of changing angular acceleration of limited duration as compared to the near-zero angular acceleration of the nearly constant movements of the telephone 100. Were the threshold acceleration to be set to about 3 rad/s$^2$ for about 0.1 seconds, the magnitudes of the angular accelerations shown in FIG. 4 would be determined to exceed the threshold acceleration over the limited duration, indicating that the telephone 100 had been tapped.

In another exemplary embodiment, identifying a contacted region of the input device can include determining a polarity of the angular acceleration that exceeds the threshold acceleration value for the limited duration. A first region of the input device can be identified as the contacted region when the polarity of the angular acceleration is positive. Similarly, a second region of the input device can be identified as the contacted region when the angular acceleration is negative. The first and second regions of the input device can be demarcated by the at least one axis.

For example, the angular acceleration curves shown in FIG. 4 indicate that tapping the bottom or right portions of the telephone 100 can each result in a positive angular acceleration. This information can be used to identify the bottom or right portions of the device 100 as the first contacted region when it is determined that the polarity of the angular acceleration is positive. Likewise, the angular acceleration curves shown in FIG. 4 indicate that tapping the top or left portions of the telephone 100 can each result in a negative angular acceleration. This information can be used to identify the top or left portions of the device 100 as the second contacted region when it is determined that the polarity of the angular acceleration is negative. The first and second regions of the input device 112 can be demarcated by the at least one axis 118. For example, the first or right and the second or left portions of the telephone 100 shown in FIG. 1B are demarcated by the axis 118.

According to another exemplary embodiment, a change in inertia can be measured around two perpendicular axes of the input device in response to the contacting of the input device. With such an arrangement, determining whether the change in inertia around the at least one axis of the input device corresponds to a tapping of the input device can include determining whether at least one magnitude of an angular acceleration of the input device around each of the perpendicular axes exceeds a threshold acceleration value over a limited duration. In a related embodiment, a polarity of each of the angular accelerations that exceeds the threshold acceleration value for the limited duration can be determined.

Once the polarity of each of the angular accelerations that exceeds the threshold acceleration value for the limited duration can is determined, this polarity information can be used to identify the contacted region of the device. A first region of the input device can be identified as the contacted region when the polarities of both angular accelerations are positive. A second region of the device can be identified as the contacted region when the polarities of both angular accelerations are negative. A third region of the device can be identified as the contacted region when the polarity of the angular acceleration around a first of the perpendicular axes is positive and the angular acceleration around a second of the perpendicular axes is negative. Also, a fourth region of the device can be identified as the contacted region when the polarity of the angular acceleration around the first perpendicular axis is negative and the angular acceleration around the second perpendicular axis is positive. Each region of the input device can be demarcated by a portion of each of the perpendicular axes.

For example, in the arrangements described in conjunction with FIG. 1, the position determining unit 130 can be configured to identify contacted regions of the input device 112, 114 based on a direction of change in angular acceleration around each of the perpendicular axes 118. As described above, tapping the bottom-right portion of the telephone 100 shown in FIG. 1B can result in the angular acceleration curves shown in FIG. 4, which indicate two positive changes in angular acceleration. The position determining unit 130 can be configured to identify the bottom-right portion of the input device 112 as a contacted first region when the polarities of both angular accelerations are positive. Likewise, tapping the top-left portion of the telephone 100 shown in FIG. 1B can result in the angular acceleration curves shown in FIG. 4, which indicate two negative changes in angular accelerations. The position determining unit 130 can be configured to identify the top-left portion of the input device 112 as a contacted second region when the polarities of both angular accelerations are positive.

The position determining unit 130 can also be configured to identify a third region of the device as the contacted region when the polarity of the angular acceleration around a first of the perpendicular axes is positive and the angular acceleration around a second of the perpendicular axes is negative. As an example, consider the angular acceleration curves shown in FIG. 4 resulting from tapping the top-right portion of the telephone 100. The angular acceleration around the first of the perpendicular axes 118 is positive and the angular acceleration around the second of the perpendicular axes 122 is negative.

The position determining unit 130 can also be configured to identify a fourth region of the device as the contacted region when the polarity of the angular acceleration around the first perpendicular axis is negative and the angular acceleration around the second perpendicular axis is positive. For example, consider the angular acceleration curves shown in FIG. 4 resulting from tapping the bottom-left portion of the telephone 100. The angular acceleration around the first of the perpendicular axes 118 is negative and the angular acceleration around the second of the perpendicular axes 122 is positive.

According to another exemplary embodiment, identifying the contacted region of the device can include identifying a boundary area of one of the regions of the device as the contacted region when only one of the respective angular accelerations exceeds the threshold acceleration value for the limited duration.

For example, consider once again the arrangement shown in FIG. 1B, wherein the sensor 116 can be configured to generate a signal related to a change in inertia around two perpendicular axes 118, 122 of the input device 112. If a user taps substantially near the right edge and near the center of the input device 112, only the angular acceleration around the axis 118 will exceed the threshold acceleration value for the limited duration. There will little or no angular acceleration around the axis 122, because in the example, the user has tapped the input device 112 substantially on the axis 122. The extent of the boundary areas can be determined by moments of inertia around each of the perpendicular axes 118, 122. Preferably, the sensor is arranged near the center of the housing 124 or input region 106 of the telephone 100.

In another embodiment, the angular velocity of the input device can be measured around the at least one axis, and then differentiated to determine an angular acceleration of the device around the at least one axis. Alternatively, an angular acceleration of the input device around the at least one axis can be measured directly, for example, using a multi-axis accelerometer 116.

The measured change in inertia around the at least one axis of the input device can be filtered prior to determining whether a change in inertia corresponds to a tapping of the input device. For example, a filter (not shown) can be coupled between the sensor 116 and the processor 120 shown in FIG. 1B to filter the signal received by the processor 120 prior to the processor determining whether the change in inertia corresponds to a tapping of the input device. The filter can be a dampening circuit configured to dampen out vibrations that can corrupt the angular velocity or angular acceleration measurement.

According to another exemplary embodiment, at least one function can be performed based on the identity of the contacted region of the input device. The at least one function can include controlling a volume of the speaker 108, scrolling through a menu displayable on the display 104, scrolling through a list of items displayable on the display 104 or in the input region 106, selecting an item of such a menu or included in such a list, or displaying characters or symbols on the display 104. An auditory feedback can be provided indicating the performing of the at least one function based on the identity of the contacted region of the input device.

In another exemplary embodiment, a plurality of changes in inertia around the at least one axis of the input device corresponding to a plurality of taps of the input device can be detected in a time frame. Performing the at least one function can be based on an order of the identified contacted regions corresponding to the plurality of taps detected within the time frame. In a related embodiment, performing the at least one function can include recognizing a character associated with the order of the identified contacted regions corresponding to the plurality of taps detected within the time frame.

For example, FIG. 5 illustrates exemplary sequences of taps that can be entered using the input device 112, 114 to form the characters shown. A user can tap the input device 112, 114 consecutively in the approximate regions shown with any given time frame, for example three seconds. The processor 120 can determine the identities of the regions tapped using the techniques described above, and then display an appropriate character in the display 104 or the input region 106 associated with the order of the identified contacted regions.

In another exemplary embodiment, the input device can be disabled based on at least one of an oral command, contacting the input device a plurality of times within a time frame, activating a manual switch of the input device, and activating a proximity switch of the input device.

The executable instructions of a computer program as illustrated in FIG. 7 for entering information into an portable electronic device can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium, or a removable storage device. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. An input device, comprising:
    a sensor configured to generate a signal related to an angular velocity around at least one axis of the input device in response to a contacting of the input device; and
    a processor configured to receive the signal from the sensor to determine whether the angular velocity around the at least one axis of the input device corresponds to a tapping of the input device, the processor further configured to identify a contacted region from a plurality of predefined tap regions of the input device based on a direction of the angular velocity around the at least one axis of the input device when the angular velocity corresponds to a tapping of the input device.

2. The input device of claim 1, wherein the processor comprises:
    an angular velocity measuring unit configured to determine whether a magnitude of an angular velocity of the input device around the at least one axis exceeds a threshold value over a limited duration.

3. The input device of claim 2, wherein the processor comprises:
    a polarity determining unit configured to determine a polarity of the angular velocity that exceeds the threshold value for the limited duration; and
    a position determining unit configured to identify a first region of the input device as the contacted region when the polarity of the angular velocity is positive and a second region of the input device as the contacted region when the angular velocity is negative, wherein the first and second regions of the input device are demarcated by the at least one axis.

4. The input device of claim 1, wherein the sensor is configured to generate a signal related to an angular velocity around two perpendicular axes of the input device.

5. The input device of claim 4, wherein the processor comprises:
an angular velocity measuring unit configured to determine whether at least one magnitude of an angular velocity of the input device around each of the perpendicular axes exceeds a threshold value over a limited duration.

6. The input device of claim 5, wherein the processor comprises:
a polarity determining unit configured to determine a polarity of each of the angular velocities that exceeds the threshold value for the limited duration; and
a position determining unit configured to identify a first region of the input device as the contacted region when the polarities of both angular velocities are positive, a second region of the device as the contacted region when the polarities of both angular velocities are negative, a third region of the device as the contacted region when the polarity of the angular acceleration velocity around a first of the perpendicular axes is positive and the angular velocity around a second of the perpendicular axes is negative, and a fourth region of the device as the contacted region when the polarity of the angular velocity around the first perpendicular axis is negative and the angular velocity around the second perpendicular axis is positive, wherein each region of the input device is demarcated by a portion of each of the perpendicular axes.

7. The input device of claim 6, wherein the position determining unit is configured to identify a boundary area of one of the tap regions of the device as the contacted region when only one of the angular velocity exceeds the threshold value for the limited duration.

8. The input device of claim 1, wherein the sensor is configured to generate a signal related to an angular velocity of the input device around the at least one axis.

9. The input device of claim 8, wherein the processor is configured to differentiate the angular velocity to determine an angular acceleration of the device around the at least one axis.

10. The input device of claim 1, wherein the sensor is configured to generate a signal related to an angular acceleration of the input device around the at least one axis.

11. The input device of claim 1, wherein the sensor comprises at least one of a gyroscope and an angular accelerometer.

12. The input device of claim 1, comprising:
a filter coupled between the sensor and the processor, the filter configured to filter the signal received by the processor prior to the processor determining whether the angular velocity around the at least one axis of the input device corresponds to a tapping of the input device.

13. An electronic device, comprising:
a housing;
an input device in accordance with claim 1; and
circuitry coupled to the input device and configured to perform at least one function based on the identity of the contacted region of the input device.

14. The electronic device of claim 13, wherein the sensor is attached to the housing of the electronic device and the contacted region of the input device includes at least one surface of the housing.

15. The electronic device of claim 14, comprising;
means for removably securing the housing to a rigid surface; and
means for facilitating a rotating of the electronic device around the at least one axis.

16. The electronic device of claim 15, wherein the means for removably securing the housing and means for facilitating a rotating of the electronic device comprise at least one of:
a gimbal removably attached to the housing; and
a plurality of deformable spacers arranged on the housing to provide friction for removably securing the housing to the rigid surface, the spacers providing a separation between the housing and the rigid surface to facilitate a rotating of the electronic device around the at least one axis.

17. The electronic device of claim 13, wherein the sensor is attached to a separately rotatable portion of the housing configured to rotate around the at least one axis and the contacted region of the input device includes the separately rotatable portion.

18. The electronic device of claim 13, wherein the electronic device is at least one of a portable telephone, a personal digital assistant (PDA), and an electronic game.

19. The electronic device of claim 13, wherein the at least one function includes controlling a volume, scrolling through a menu, scrolling through a list of items, selecting an item of a menu or included in a list, and displaying characters or symbols.

20. The electronic device of claim 13, comprising:
an input feedback unit configured to provide an auditory response identifying the at least one function performed based on the identity of the contacted region of the input device.

21. The electronic device of claim 13, wherein the processor is configured to detect within a time frame a plurality of angular velocities around the at least one axis of the input device corresponding to a plurality of taps of the input device, wherein the circuitry coupled to the input device is configured to perform the at least one function based on an order of the identified contacted regions corresponding to the plurality of taps detected within the time frame.

22. The electronic device of claim 21, wherein the at least one function includes recognizing a character associated with the order of the identified contacted regions corresponding to the plurality of taps detected within the time frame.

23. The electronic device of claim 13, wherein the contacted region of the input device includes at least one of a keypad, a touchpad, a touchscreen, and a display of the device.

24. The electronic device of claim 13, comprising at least one other input device selected from a group consisting of:
a keypad, a touchpad, a touchscreen, a display, a joy-stick, a mouse, and an audio response unit.

25. The electronic device of claim 13, wherein the processor is configured to disable the input device based on at least one of an oral command, tapping the input device a plurality of times within a time frame, a manual switch, and a proximity switch.

26. A method of entering information into an electronic device, comprising:
measuring an angular velocity around at least one axis of an input device in response to a contacting of the input device;

determining whether the angular velocity around the at least one axis of the input device corresponds to a tapping of the input device;

identifying a contacted region from a plurality of predefined tap regions of the input device based on a direction of the angular velocity around the at least one axis of the input device when the angular velocity corresponds to a tapping of the input device; and outputting the identity of the contacted region of the input device to circuitry coupled to the input device.

27. The method of claim 26, wherein determining whether the annular velocity around the at least one axis of the input device corresponds to a tapping of the input device comprises:

determining whether a magnitude of an angular velocity of the input device around the at least one axis exceeds a threshold value over a limited duration.

28. The method of claim 27, wherein identifying a contacted region of the input device comprises:

determining a polarity of the angular velocity that exceeds the threshold value for the limited duration; and identifying a first region of the input device as the contacted region when the polarity of the angular velocity is positive and a second region of the input device as the contacted region when the angular velocity is negative, wherein the first and second regions of the input device are demarcated by the at least one axis.

29. The method of claim 26, comprising:

measuring an angular velocity around two perpendicular axes of the input device in response to the contacting of the input device.

30. The method of claim 29, wherein determining whether the angular velocity around the at least one axis of the input device corresponds to a tapping of the input device comprises:

determining whether at least one magnitude of an angular velocity of the input device around each of the perpendicular axes exceeds a threshold value over a limited duration.

31. The method of claim 30, wherein identifying a contacted region of the device comprises:

determining a polarity of each of the angular velocity that exceeds the threshold value for the limited duration; and identifying a first region of the input device as the contacted region when the polarities of both angular velocities are positive, a second region of the device as the contacted region when the polarities of both angular velocities are negative, a third region of the device as the contacted region when the polarity of the angular velocity around a first of the perpendicular axes is positive and the angular velocity around a second of the perpendicular axes is negative, and a fourth region of the device as the contacted region when the polarity of the angular velocity around the first perpendicular axis is negative and the angular velocity around the second perpendicular axis is positive, wherein each region of the input device is demarcated by a portion of each of the perpendicular axes.

32. The method of claim 31, wherein identifying a contacted region of the device comprises:

identifying a boundary area of one of the regions of the device as the contacted region when only one of the angular velocities exceeds the threshold value for the limited duration.

33. The method of claim 26, comprising:

measuring the angular velocity of the input device around the at least one axis; and differentiating the angular velocity to determine an angular acceleration of the device around the at least one axis.

34. The method of claim 25, comprising:

measuring an angular acceleration of the input device around the at least one axis.

35. The method of claim 26, comprising:

filtering the measured angular velocity around the at least one axis of the input device prior to determining whether the angular velocity corresponds to a tapping of the input device.

36. The method of claim 26, comprising:

performing at least one function based on the identity of the contacted region of the input device.

37. The method of claim 36, wherein performing the at least one function comprises at least one of controlling a volume, scrolling through a menu, scrolling through a list of items, selecting an item of a menu or included in a list, and displaying characters or symbols.

38. The method of claim 36, comprising:

providing an auditory feedback indicating the performing of the at least one function based on the identity of the contacted region of the input device.

39. The method of claim 36, comprising:

detecting in a time frame a plurality of angular velocities around the at least one axis of the input device corresponding to a plurality of taps of the input device, wherein the circuitry coupled to the input device is configured to perform the at least one function based on an order of the identified contacted regions corresponding to the plurality of taps detected within the time frame.

40. The method of claim 39, wherein performing the at least one function comprises recognizing a character associated with the order of the identified contacted regions corresponding to the plurality of taps detected within the time frame.

41. The method of claim 26, comprising:

disabling the input device based on at least one of an oral command, tapping the input device a plurality of times within a time frame, activating a manual switch of the input device, and activating a proximity switch of the input device.

42. A computer readable medium containing a computer program for entering information into an electronic device, wherein the computer program comprises executable instructions for:

measuring an angular velocity around at least one axis of an input device in response to a contacting of the input device;

determining whether the angular velocity around the at least one axis of the input device corresponds to a tapping of the input device;

identifying a contacted region from a plurality of predefined tap regions of the input device based on a direction of the angular velocity around the at least one axis of the input device when the angular velocity corresponds to a tapping of the input device; and outputting the identity of the contacted region of the input device to circuitry coupled to the input device.

43. The computer readable medium of claim 42, wherein the computer program comprises executable instructions for:

determining whether at least one magnitude of an angular velocity of the input device around each of the perpendicular axes exceeds a threshold value over a limited duration.

44. The computer readable medium of claim 43, wherein the computer program comprises executable instructions for:
  determining a polarity of each of the angular velocities that exceeds the threshold value for the limited duration, and
  identifying a first region of the input device as the contacted region when the polarities of both angular velocities are positive, a second region of the device as the contacted region when the polarities of both angular velocities are negative, a third region of the device as the contacted region when the polarity of the angular velocity around a first of the perpendicular axes is positive and the angular velocity around a second of the perpendicular axes is negative, and a fourth region of the device as the contacted region when the polarity of the angular velocity around the first perpendicular axis is negative and the angular velocity around the second perpendicular axis is positive, wherein each region of the input device is demarcated by a portion of each of the perpendicular axes.

45. The computer readable medium of claim 44, wherein the computer program comprises executable instructions for:
  identifying a boundary area of one of the regions of the device as the contacted region when only one of the angular velocities exceeds the threshold value for the limited duration.

* * * * *